United States Patent [19]

Hansen et al.

[11] Patent Number: 4,850,735
[45] Date of Patent: Jul. 25, 1989

[54] LATCHING MECHANISM WITH INTEGRAL KEY MEMBER

[76] Inventors: Paul D. Hansen, 307 Los Pinos Way, San Jose, Calif. 95119; Garrett B. DeCerce, 15003 S.E. 143rd Pl., Renton, Wash. 98056; William J. Schmidt, Jr., 2130 Half Rd., Morgan Hill, Calif. 95037

[21] Appl. No.: 236,050

[22] Filed: Aug. 24, 1988

Related U.S. Application Data

[62] Division of Ser. No. 110,685, Oct. 20, 1987, Pat. No. 4,780,924.

[51] Int. Cl.$^4$ .................................................. B25G 5/18
[52] U.S. Cl. ........................................ 403/330; 24/615; 403/329; 403/361
[58] Field of Search ................ 24/588, 593, 597, 604, 24/615; 403/329, 330, 326, 361

[56] References Cited

U.S. PATENT DOCUMENTS 1,085,543  1/1914  Collins ............................ 403/329
3,196,878  7/1965  Hedu ............................... 24/615
3,844,000  10/1974 Hedu ............................... 24/615

*Primary Examiner*—Randolph A. Reese
*Assistant Examiner*—Carol I. Bordas
*Attorney, Agent, or Firm*—Allston L. Jones

[57] ABSTRACT

A latching mechanism for affixing a first item to a second item includes a male latching portion affixed to the first item, and a cavity defined within the second item disposed to receive the male latching portion. The male latching portion includes a tongue affixed to, and extending outward from, the surface of the end of the first item that is to abut the surface of the end of the second item when the first item is affixed to the second item. The tongue of the male latching portion defines a spring finger therewithin having one end thereof affixed to the end of the tongue closest to the surface of the end of the first item and extends outward therefrom surrounded by the sides and end of the tongue. The spring finger has at its free end a locking tooth that extends downward from the tongue to be captured within the cavity of the second item.

2 Claims, 6 Drawing Sheets

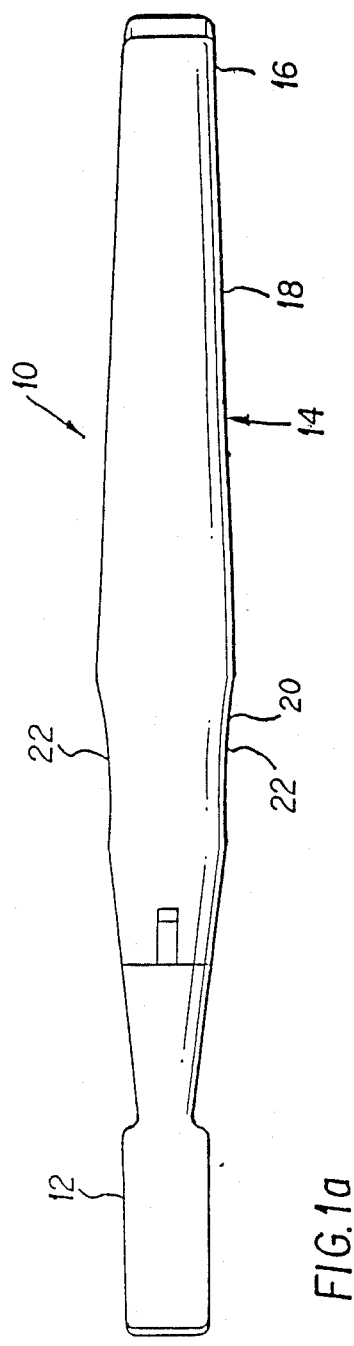
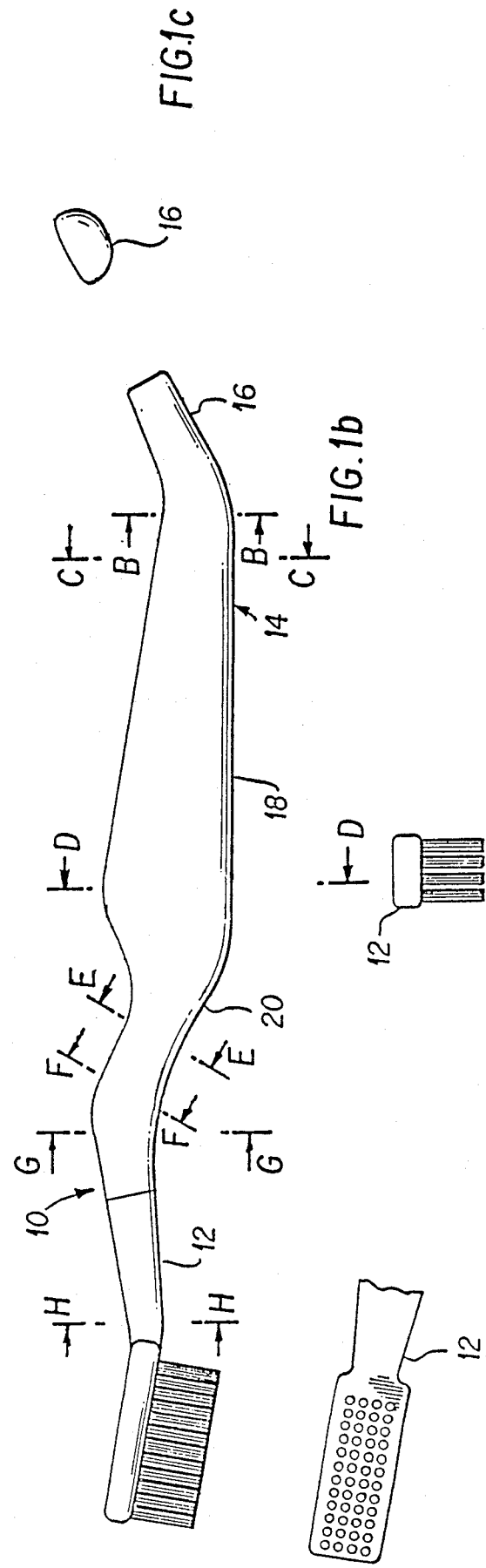

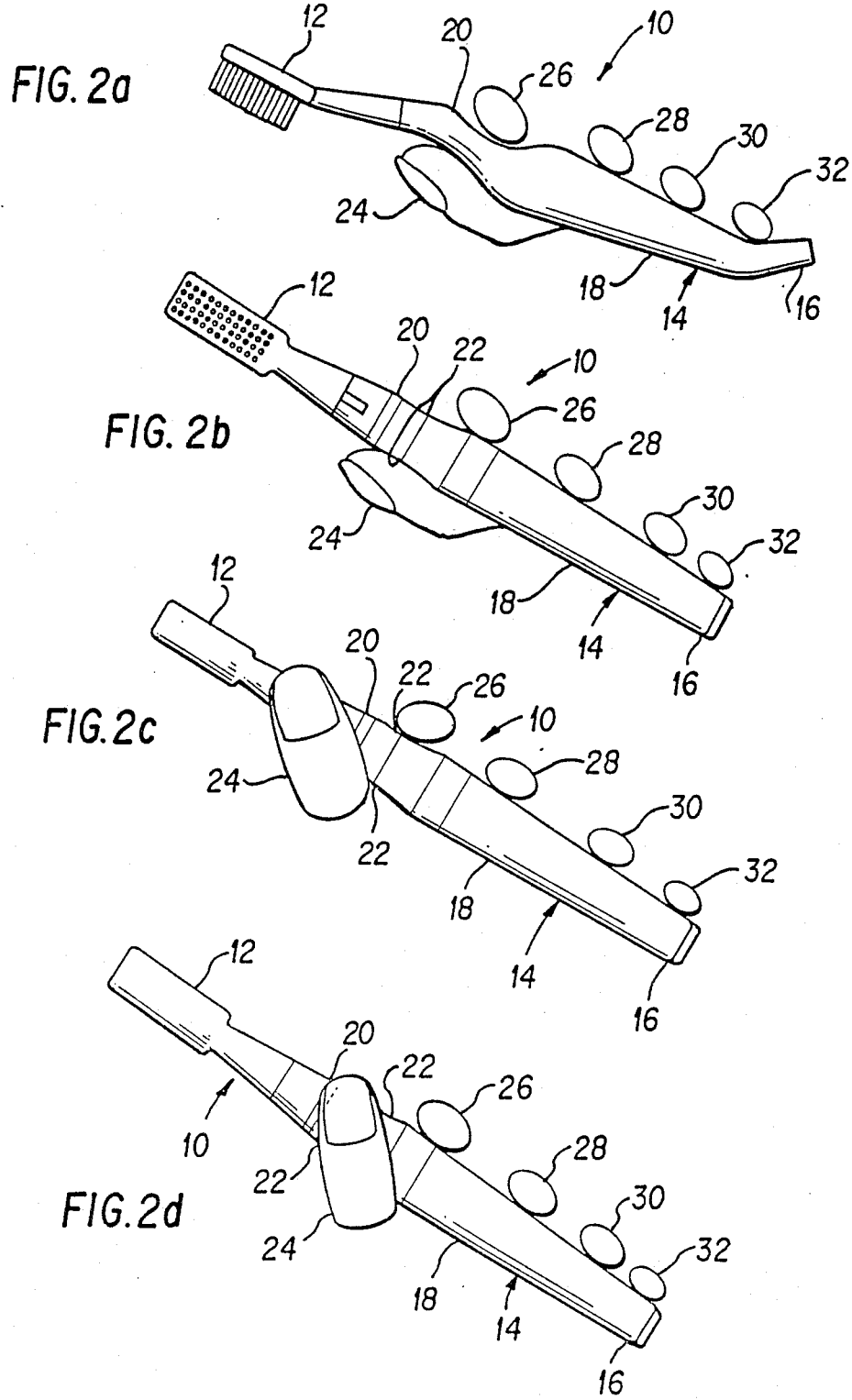

LATCHING MECHANISM WITH INTEGRAL KEY MEMBER

This is a division, of application Ser. No. 110,685, filed Oct. 20, 1987, now U.S. Pat. No. 4,780,924.

BACKGROUND OF THE INVENTION

The present invention relates to toothbrushes having a handle to allow the user to have positive control of the brushing action while being used with either the right or the left hand, and more particularly to toothbrushes having a replaceable brush head when the bristles have worn down.

The prior art includes numerous toothbrushes with various bristle orientations, head angles, and other appliances attached to the handle of the toothbrush. Additionally, there is a toothbrush sold under the name "RADIUS" that has a handle that is shaped to provide positive control of the use of the brush, however the handle design of that brush is such that there is a right hand model and a left hand model. The bristle layout of this brush is in the shape of an oval. Further, no toothbrush is known to have a replaceable head.

It would be desirable to have a toothbrush that provides for positive control of the brushing action by means of a handle that is designed to be comfortably held by the user in any way that suits him regardless of which hand he uses. In addition, it would be desirable to have replaceable heads for the tooth brush to minimize disease transmission and the cost of the brush to the consumer. The present invention provides such a toothbrush design.

SUMMARY OF THE INVENTION

In accordance with the illustrated embodiments, the present invention provides a toothbrush with a handle portion in the shape of a bent trapezoid and a head portion affixed thereto, and a latch mechanism to affix two items to each other. The toothbrush includes a handle portion with a main body region, a tail region and an "S" shaped region. The main body region is substantially rectalinear in shape with a length that is several times longer than either its height or width. In addition, the main body region defines a top, a bottom and two side surfaces. The tail region is affixed to one end of the main body region and angled upward through a selected angle with the top surface of the main body region. The "S" shaped region is affixed to the other end of the main body region with an upper and a lower curved indentation to form the "S". The surfaces of the "S" shaped region that that form the "S" are extensions of the top and bottom surfaces of the main body region. Finally, the head portion is affixed to the distal end of the "S" shaped region, with the head portion having bristles affixed thereto in a selected pattern.

The latching mechanism for affixing a first item to a second item includes a male latching portion affixed to the first item, and a cavity defined within the second item disposed to receive the male latching portion on the first item. The male latching portion includes a "U" shaped body with the top of each leg of the "U" being affixed to, and extending outward from, the surface of the the end of the first item that is to abut the surface of the end of the second item when the first item is affixed to the second item. The male latching portion also includes a spring finger having one end thereof affixed to the same surface to which the legs of the "U" shaped body are affixed and extends outward therefrom between the legs of the "U" shaped body. The spring finger has at its other end a locking tooth that extends outward from between the legs of the "U" shaped body.

BRIEF DESCRIPTION OF THE FIGURES

FIGS. 1a–e show several plan views of a first embodiment of the toothbrush of the present invention including top, side, both ends, and bristle format views.

FIGS. 2a–d show several ways that the toothbrush of the present invention can be held by the user.

DESCRIPTION OF THE PREFERRED EMBODIMENTS

The present invention is an ergonomically designed toothbrush which provides positive control during brushing while being comfortable to grasp in numerous ways with either hand. In addition, the head is designed to be removable when the bristles wear down to minimize the replacement cost of the brush.

Figure 1F:
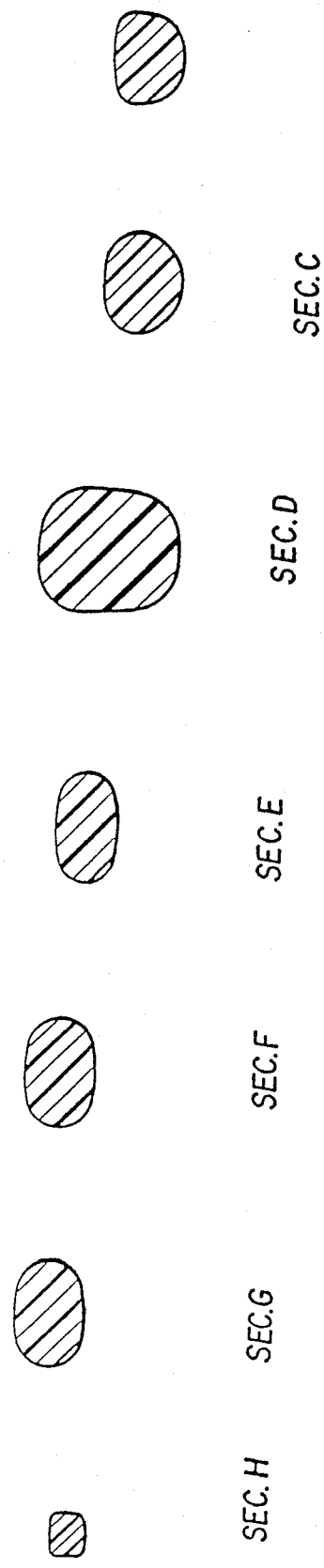
FIG. 1f shows the cross-sectional shapes of the handle and brush head of the tooth brush of FIGS. 1a–e.

Referring to FIGS. 1a–e there are shown several views of the toothbrush 10 of a first embodiment of the present invention, and in FIG. 1f there are shown the cross-sectional shapes of the handle and head at several points along its length. From these views it can be seen that the handle is a bent trapezoid which is substantially rectangular in cross-section throughout its length. To improve the comfort when the handle is grasped, the corners of the surface of the handle, both radially and axially, are rounded.

Toothbrush 10 has a head portion 12 and a handle portion 14. Head 12 is removably affixed to handle portion 14 to permit the replacement of head portion 12 when the bristles are worn or bacterially infected. Additionally, handle portion 14 has three regions: a main body region 18, a tail region 16 and an "S" shaped region 20. As shown, the head portion 12 attaches to proximate end of the "S" shaped region 20 of the handle portion, which is next followed by the main body region 18 and then the tail region 16. From FIG. 1b it can be seen that the radius of curvature of the bristle side of the "S" shaped region 20 is approximately 3.5 times the radius of curvature of the other side of the "S" shaped region 20. Those two indentations are provided to accommodate the thumb and forefinger of the user, and it is those indentations, when the toothbrush is grasped thereby, that provide the control of the brush during usage. Also, in FIG. 1b it can be seen that the tail region 16 turns upward with respect to the bristle side of head 12, as does head 12 unlike the prior art which turns downward.

In FIG. 1a it can further be seen that the "S" shaped region 20, when viewed from the top or bottom, has a slight hour glass shape as a result of indentations 22. Indentations 22 are also provided to accommodate the thumb and forefinger of the user to control the brush in use, when so held. The main body region 18 and the tail region 16 are provided to accommodate the other three fingers of the user when the toothbrush 10 is being used. Additionally, the tail region 16 is approximately 12% of the overall length of the toothbrush 10 of the present invention and may or may not be contacted during use depending on the way that the user chooses to hold tooth 10 during use thereof.

Figure 6A:
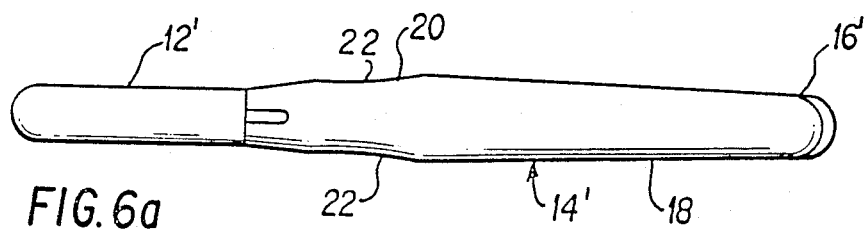
FIGS. 6a–c show a top and side plan views, and a bottom plan view of the bristle side of the head portion, of a second embodiment of the toothbrush of the present invention.
Figure 6B:
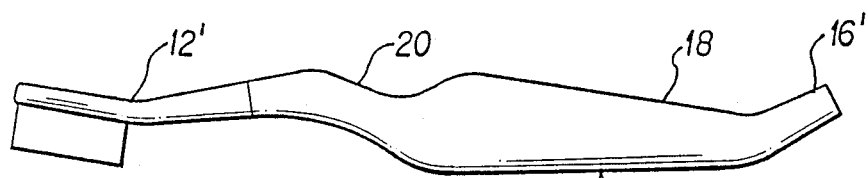
Figure 6C:
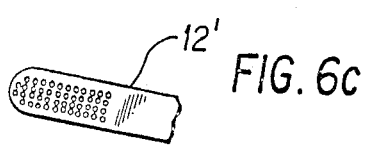

A second embodiment of the toothbrush of the present invention is shown in FIGS. 6a-c. The differences between this embodiment and the first embodiment are only in the outline shape of the head portion 12' and tail region 16'. Head portion 12' has a rounded forward end instead of a squared off forward edge as in head portion 12. Additionally, head 12' does not neck down behind the bristles as does head portion 12. The distal end of tail region 16' is also curved instead of substantially square as in tail region 16. Otherwise toothbrush 14' is the same as tooth brush 14.

Referring next to FIGS. 2a-d there is shown four ways of holding tooth brush 10 with the right hand. For ease of viewing the accommodation of the users fingers 26-32 and thumb 24 as they grasp the handle portion 14, only the portion of the fingers 26-32 and thumb 24 were they contact the handle portion 14 are shown. In FIGS. 2a the thumb 24 and the forefinger 26 are contacting the large and small radius of curvature sections, respectively, of the "S" shaped region 20 of tooth brush 10, with the other fingers 28-32 being accommodated by the main body region 18 and tail region 16.

In FIG. 2b the thumb 24 and forefinger 26 are grasping the "S" shaped region 20 on opposite sides in indentations 22, with the other fingers 28-32 being accommodated by the main body region 18 and tail region 16.

In FIG. 2c thumb 24 is in contact with the back of "S" shaped region 20 forward of the smaller radius of curvature indentation and forefinger 26 is in contact with one of indentations 22 and extents beneath the "S" shaped region to make contact with the large radius of curvature indentation on the bottom of handle portion 14. The other fingers 28-32 are, in this view, accommodated by the side of main body region 18 and tail region 16.

In FIG. 2d thumb 24 is contacting the small radius of curvature section of the "S" shaped region 20 of tooth brush 10, with fingers 26-32 being accommodated by the main body region 18 and tail region 16.

Note, the above-described ways of grasping toothbrush 10 are presented as illustrative of the ways that it can be grasped and are not intended to be the only ways. Additionally, tooth brush 10 can be grasped by the left hand in the same ways as illustrated in each of FIGS. 2a-d. To make those figures illustrative of left handed grasping of toothbrush 10, one need only make mirror images of them.

Figure 3A:
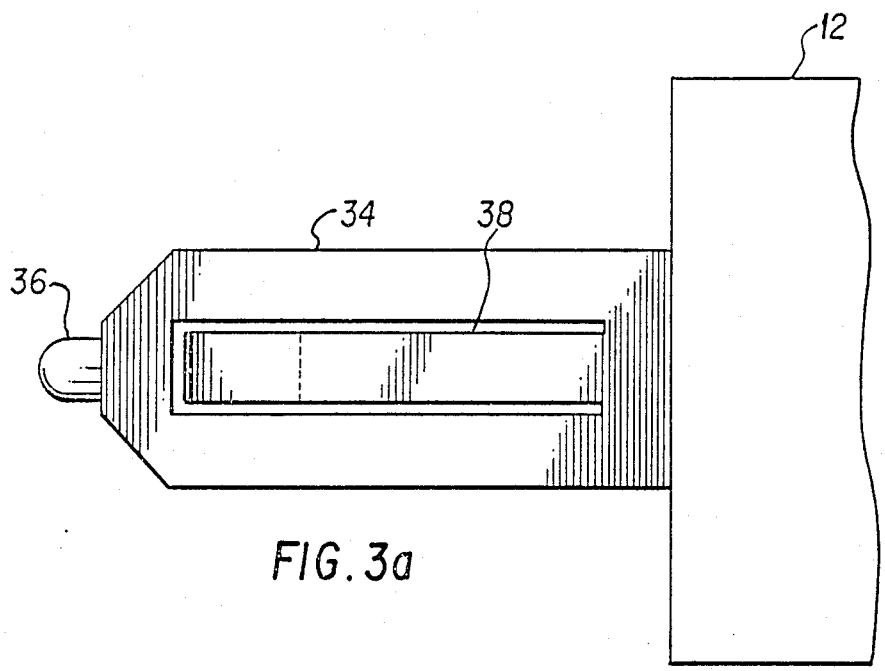
FIGS. 3a and b show a top and side views, respectively, of the male latch portion affixed to the brush head of the present invention.
Figure 3B:
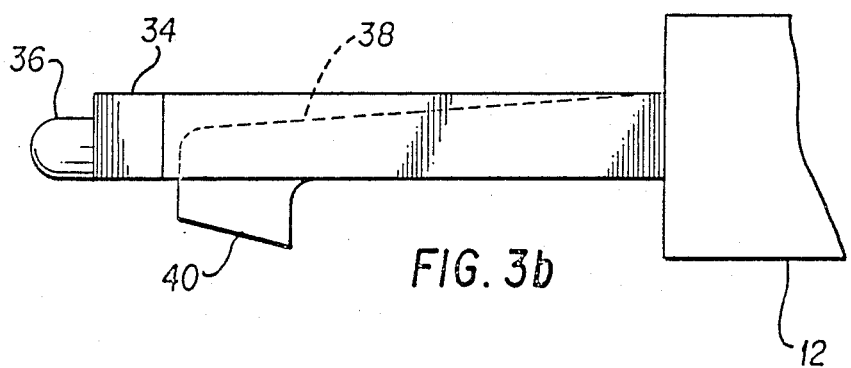
Figure 4:
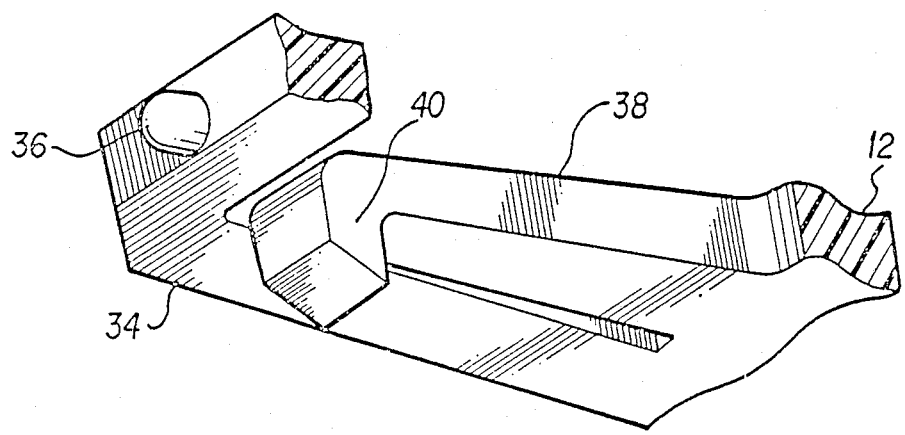
FIG. 4 shows a partial cut-away perspective view of the male latch portion affixed to the brush head of the present invention.

Details of the latching mechanism between the head portion 12 and the handle portion 14 are shown in FIGS. 3-5. The male latch portion is affixed to head portion 12 and the cavity for receiving same is defined in the end of the handle portion 14. FIGS. 3a-b, 4 and 5b each shows a view of the male latch portion, FIG. 5a shows details of the cavity in the end of the handle portion 14 for receiving the male latch portion, and FIGS. 5c and d illustrate the mating and the release of the latch. While the latching mechanism herein is described as being for the mounting of a removable toothbrush head to a specially design toothbrush handle, it is not intended that this latching mechanism can only be utilized for toothbrushes. The latching mechanism disclosed herein can be utilized in any situation where a firm, yet temporary, attachment is desired.

The male latch portion is a flat tongue shaped projection from head portion 12 and includes includes a "U" shaped body 34 that has the top of each leg, or side rail, of the "U" attached to the end of the head portion 12 that abuts the handle portion 14 when it is mounted thereto. Within the opening of the "U", formed by the side rails and an end rail joining the ends of the side rails furthest from the head portion 12, there is a spring finger 38 having one end affixed to the same surface of head portion 12 as are the ends of the side rails furthest from the end rail of the "U" shaped body 34. The free end of spring finger 38 turns downward forming a locking tooth 40. The lower surface of locking tooth 40 is inclined wherein the locking tooth 40 is shortest furthest from the attached end of spring finger 38. Additionally, affixed to the center of the end rail of the "U" shaped body 34 at the furthest extent from, and extending away from, head portion 12 is a key 36.

Figure 5A:
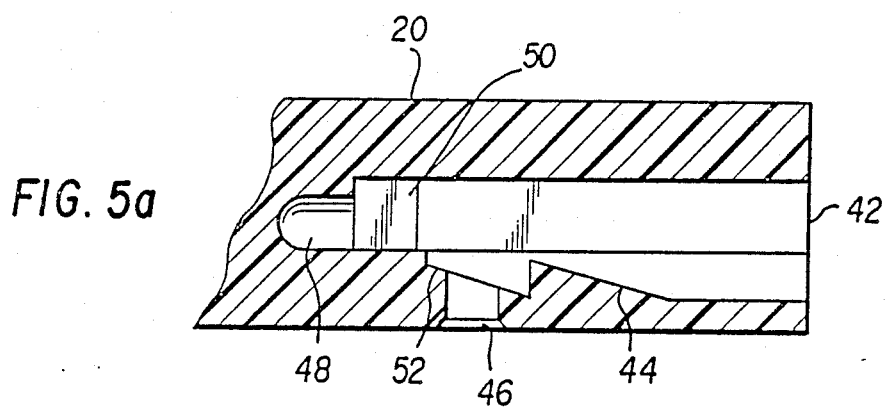
FIG. 5a shows in a cross-sectional side plan view the cavity into which the male latch portion is received by the end of the handle of the present invention.
Figure 5B:
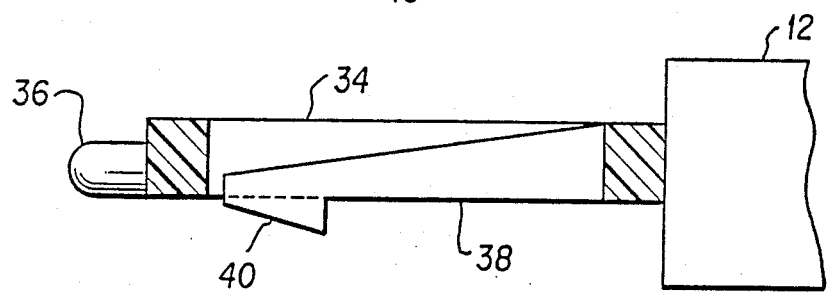
FIG. 5b shows a cross-sectioned side plan view of the male latch portion of FIGS. 3a–b and 4.

Referring next to FIG. 5a there is shown a partial cut-away side plan view of the latch receiving cavity 42 in the end of handle portion 14. It can be seen that cavity 42 defines a space shaped to receive the male latch portion. Cavity 42 includes a ramp 44 up which the lower sloped face of locking tooth 40 advances as the male latch portion is inserted into cavity 42. When fully inserted, locking tooth 40 snaps into recess 52 when key 36 is fully seated into the distal end 48 of cavity 42. In communication with recess 52 from the lower surface of handle portion 14 is a channel 46 for use when the male latch portion is to be released from cavity 42.

Figure 5C:
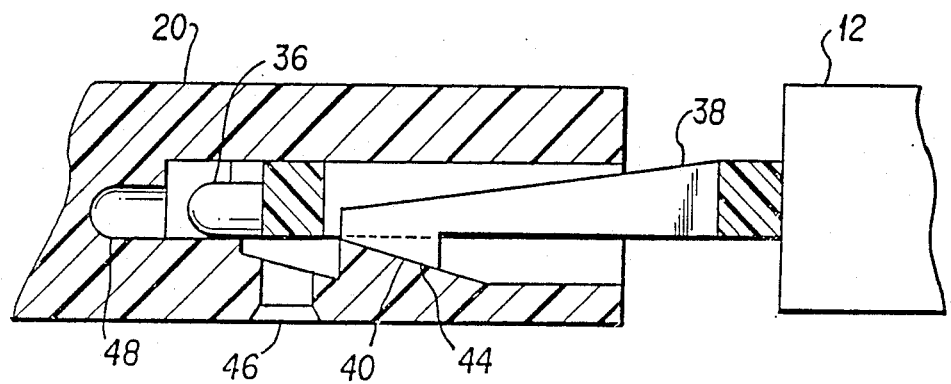
FIG. 5c shows the male latch portion partially inserted into the cavity of FIG. 5a by means of a cross-sectioned side plan view.
Figure 5D:
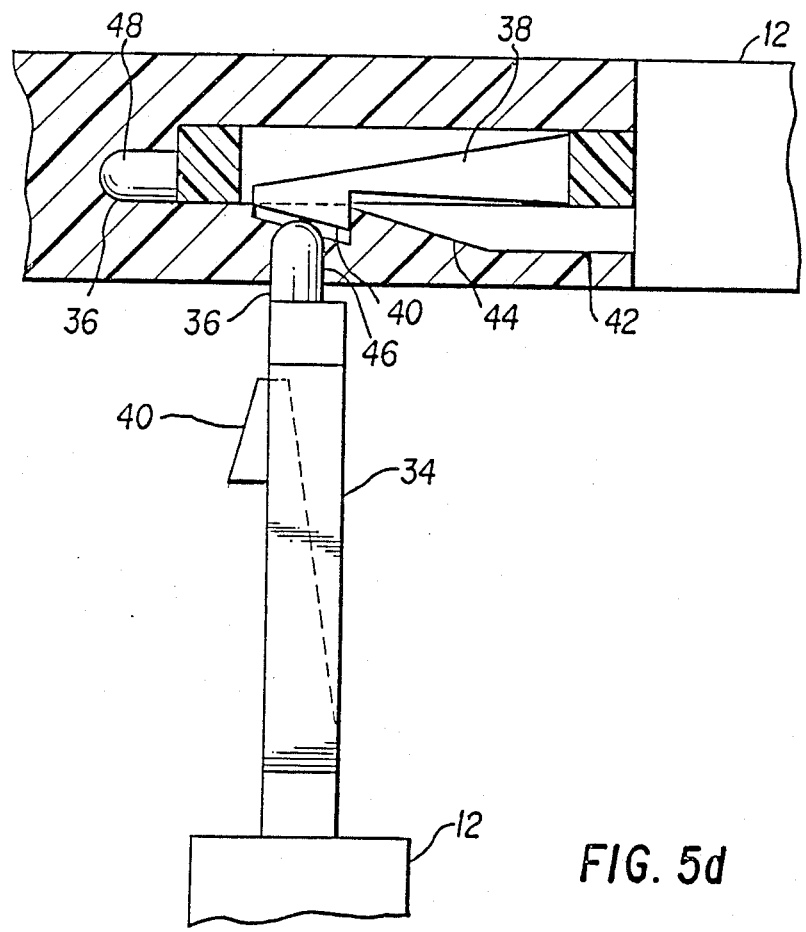
FIG. 5d shows by means of a partial cross-section side plan view the male latch portion fully inserted into the cavity of FIG. 5a and the tip of the male latch portion of another brush head in position to release the captured male latch portion.

In FIG. 5c the male latch portion is partially inserted into cavity 42 with key 36 in alignment with end 48 and the lower face of tooth 40 in contact with ramp 44. In FIG. 5d the male latch portion is shown fully inserted into cavity 42 with key 36 in end 48 and locking tooth 40 captured by recess 52. Additionally, FIG. 5d illustrates the method for releasing the male latch portion from cavity 42. This is accomplished by inserting key 36 of a second male latch portion into channel 46 to push locking tooth 40 inward to release it from recess 52.

From the foregoing description, it will be apparent that the invention disclosed herein provides novel and advantageous toothbrush and latching mechanism designs. As will be understood by those familiar with the art, the invention may be embodied in other specific forms without departing from the spirit or essential characteristics thereof.

What is claimed is:

1. A latching mechanism for affixing a first item to a second item, said latching mechanism comprising:

a male latching portion affixed to said first item, said mail latching portion having:

a tongue affixed to, and extending outward from, the surface of the end of the first item that is to abut the surface of the end of the second item when the first item is affixed to the second item, said tongue defining an opening therethrough and has a key affixed to, and extending away from, the end of the tongue at the furthest extent from the surface to which the tongue is affixed; and a spring finger having one end thereof affixed to an edge of said opening in said tongue closest to the same surface to which the tongue is affixed and extends outward therefrom between the other edges of the opening in the tongue, said spring finger also has at its other end a locking tooth that extends beyond one surface of the tongue; and said second item includes a cavity defined within the end thereof to which the first item is to be affixed, said cavity being shaped to receive the male latching portion affixed to said first item; said second item defines within said cavity:

a recess disposed for receiving the locking tooth of the male latching portion to snap into when the male latching portion is fully inserted into said cavity; and a channel between the outer surface of the second item and said recess disposed to receive the key on the tongue of a first item not mounted on the second item to push the locking tooth of the first item mounted on the second item inward as the key is advanced into the channel to release the locking tooth from the recess within the cavity.

2. A latching mechanism for affixing a first item to a second item, said latching mechanism comprising:

a male latching portion affixed to said first item, said male latching portion having:

a tongue affixed to, and extending outward from, the surface of the end of the first item that is to abut the surface of the end of the second item when the first item is affixed to the second item, said tongue defining an opening therethrough; and a spring finger having one end thereof affixed to an edge of said opening in said tongue closest to the surface to which the tongue is affixed and extends outward therefrom between the other edges of the opening in the tongue, said spring finger also has at its other end a locking tooth that extends beyond one surface of the tongue, the end of said locking tooth has an end surface with the edge thereof that is closest to the surface to which the tongue is affixed extends further from said one surface of the tongue than the edge furthest from the surface to which the tongue is affixed extends; and said second item includes a cavity defined within the end thereof to which the first item is to be affixed, said cavity being shaped to receive the male latching portion affixed to said first item, said cavity of the second item further includes an inwardly extending upward sloping ramp disposed to mate with the end of the locking tooth as the male latching portion is inserted into, or withdrawn from said cavity with a recess located beyond said ramp within said cavity for receiving said locking tooth.

* * * * *